US006684572B2

(12) United States Patent
Homolka et al.

(10) Patent No.: US 6,684,572 B2
(45) Date of Patent: Feb. 3, 2004

(54) JAMB PROTECTION SYSTEM

(75) Inventors: Frank Joseph Homolka, Laporte, CO (US); Craig Earl Bath, Fort Collins, CO (US)

(73) Assignee: Jambskins, Inc., LaPorte, CO (US)

( * ) Notice: Subject to any disclaimer, the term of this patent is extended or adjusted under 35 U.S.C. 154(b) by 0 days.

(21) Appl. No.: 09/769,090

(22) Filed: Jan. 24, 2001

(65) Prior Publication Data

US 2001/0049909 A1 Dec. 13, 2001

Related U.S. Application Data

(60) Provisional application No. 60/178,006, filed on Jan. 24, 2000.

(51) Int. Cl.[7] .................................................. B60J 5/00
(52) U.S. Cl. ........................................................ 49/462
(58) Field of Search .......................... 49/460, 462, 504; 52/211, 717.01

(56) References Cited

U.S. PATENT DOCUMENTS

| | | | | | |
|---|---|---|---|---|---|
| 1,620,933 | A | * | 3/1927 | Wilcox | 49/462 |
| 2,837,787 | A | * | 6/1958 | Wright | 49/462 |
| 3,318,061 | A | * | 5/1967 | Stentz | 49/462 |
| 4,768,320 | A | | 9/1988 | Weller | 52/211 |
| 5,083,399 | A | * | 1/1992 | Schotthoefer | 49/462 |
| 5,203,130 | A | | 4/1993 | Freelove | 52/211 |
| 5,737,878 | A | | 4/1998 | Raulerson et al. | 49/462 |
| 5,799,443 | A | | 9/1998 | Koeniguer | 49/383 |
| 5,815,998 | A | * | 10/1998 | Wamsher | 49/462 |

* cited by examiner

*Primary Examiner*—Jerry Redman
(74) *Attorney, Agent, or Firm*—Santangelo Law Offices, P.C.

(57) ABSTRACT

A jamb protection system that may be installed to jambs to reduce damage to the jamb or injury to persons working around jambs. Force absorbing and disseminating elements help to spread and transmit forces applied to the jamb protection system.

7 Claims, 10 Drawing Sheets

JAMB PROTECTION SYSTEM

This application claims the benefit of U.S. Provisional Application No. 60/178,006 filed on Jan. 24, 2000.

BACKGROUND OF THE INVENTION

Generally the invention relates to a device for the protection of jambs, such as door openings, end walls, or the like from injury or damage resulting from contact with persons or objects. Specifically, the invention relates to force dissemination and force absorbtion technology and techniques which can be incorporated into jamb protection devices which may be removably applied to jambs.

Jambs are prone to damage. Whether the jamb is cased or uncased opening; defining a door, a window, or an arch, as examples, the jamb is prone to damage when persons or objects come in contact with them. The jamb may be particularly prone to damage during periods of construction or during periods when the tenants of a building are relocating. The persons or objects which come in contact with the jamb may also be injured as well.

There is a large commercial market for jamb protection systems. Because there is a large commercial demand for jamb protection systems, the designs and technology incorporated into jamb protection systems have taken a variety of forms. In spite of the variety of designs and technology available to potential buyers, substantial problems remain unresolved with providing a jamb protection system having sufficient force absorbance and force dissemination characteristics. As such, there is a continued demand in the marketplace for innovations in jamb protection technology.

A significant problem with existing jamb protection devices can be that the surfaces are not sufficiently force disseminating. As disclosed by U.S. Pat. Nos. 5,203,130; 4,768,320; 5,737,878; and 5,799,443, each hereby incorporated by reference, many jamb protection devices fit snuggly to a door frame. The resulting configurations may present surface features that terminate in relatively small radius and therefore may not disseminate the force of contact over a large area either with respect to the jamb protection device or with respect to the object or person coming in contact with the jamb protection device.

A similar problem with existing jamb protection devices can be that the surfaces have insufficient force absorbance characteristics. As disclosed by U.S. Pat. Nos. 5,203,130; 4,768,320; 5,737,878; and 5,799,443, each hereby incorporated by reference, these jamb protection devices are configured to have little or no space between the jamb and the jamb protection devices. This may not allow for adequate give or recoil of the jamb protection device upon coming in contact with an object or person.

A related problem with existing jamb protection devices that have little give or recoil may be injury to the person or object coming in contact with such a little give or recoil jamb protection device.

Another problem with existing jamb protection devices may be a lack of components to sufficiently grip the jamb. Door frame protection devices, as those disclosed by U.S. Pat. Nos. 4,768,320; and 5,737,878, each hereby incorporated by reference, may come loose from the door frame when struck. A related problem as disclosed by U.S. Pat. Nos. 5,203,130; and 5,799,443; each hereby incorporated by reference, may be that the gripping components are not sufficiently hebetated. The gripping components may, as a result, damage the jamb themselves.

Another problem with existing jamb protection devices may be a lack of openings conformed to work around hinges, baseboards, or the like. Door frame protection devices such as those disclosed by U.S. Pat. Nos. 4,768,320; 5,203,130; 5,737,878 and 5,779,443, each hereby incorporated by reference, do not have hinge accommodation openings or do not have base board accommodation openings. The lack of baseboard accommodation openings may cause the jamb protection device to be hard to use or become dislodged during use, both can be a frustration to the user.

Still another problem with existing jamb protection devices may be that they catch cords, hoses, lines, or the like. Door frame protection devices, as disclosed by U.S. Pat. Nos. 4768,320; 5,203,130; 5,737,898; and 5,799,443, each hereby incorporated by reference, have configurations which may catch cords, hoses, lines, or the like because they lack a rounded shape or lack baseboard adaptation openings allowing cords, or the like, to become snagged on the bottom of the jamb or on the bottom of the jamb protection device. Certain types of cords and hoses have metal connectors which may cause significant damage to the jamb as a result.

Yet another problem with existing jamb protection devices may be that they are difficult to use. For example, as disclosed by U.S. Pat. No. 5,203,130, hereby incorporated by reference, existing jamb protection devices often have straps or clips to secure the device to the jamb. Or as disclosed by U.S. Pat. No. 5,799,449, hereby incorporated by reference, the jamb protection device may use adjustable toothed clips that have to be cut to size to make a proper fit. Neither of these jamb protection devices have a size accommodating shape or quick fit design.

A related problem with existing jamb devices may be that they are cumbersome. As disclosed by U.S. Pat. No. 5,203,130, hereby incorporated by reference, some jamb protection devices comprise a multiple component system which may be awkward for the user to carry and install. Or as disclosed by U.S. Pat. No. 5,799,443, hereby incorporated by reference, the user may have to use a knife to cut pieces from the jamb device to allow the proper fit and then slip each leg extension into the correct tooth of the center section. The center section is similarly adjustable in this cumbersome manner. The use of such jamb devices having adjustable tooth clips and straps with clips and the like may be cumbersome to transport, awkward to install, and may be frustrating for the user.

Still another problem with existing jamb devices may be the lack of warning colors. Jamb devices such as disclosed by U.S. Pat. Nos. 4,768,320; 5,203,130; 5,737,878; and 5,799,443, each hereby incorporated by reference, lack warning colors to draw attention to the device to reduce the incidence of impacts from persons or objects.

From the consumers point of view a problem with existing jamb devices may be increased expense. One aspect of this problem may be the that more complex jamb devices are more costly to produce and thereby more costly to purchase. Examples of such jamb protection devices may be disclosed by U.S. Pat. Nos. 5,203,130; 5,799,443; and 4,768,320, each hereby incorporated by reference. Moreover, jamb devices with greater numbers of components may be more costly to maintain.

A second problem from the consumers point of view may be the amount of time to install more complex jamb devices such as disclosed by U.S. Pat. Nos. 5,799,443, and 5,203,130. It simply may take more time to adjust straps and clips during installation of such complex jamb device to the jamb.

With respect to making and using jamb protection devices, the present invention discloses technology which addresses every one of the above-mentioned problems in a practical fashion.

SUMMARY OF INVENTION

A broad object of the invention can be to protect jambs from damage due to contact with persons or objects. Due to the unresolved problems with respect to jamb protection, as described above, the objects of the invention are numerous.

A significant object of particular embodiments of the invention can be to provide a jamb protection system which absorbs the forces generated by contact with objects or persons. One aspect of this object may be to provide sufficient give and recoil so that impact to the jamb protection device may not transmit sufficient force to damage the jamb. Another aspect of this object may be to reduce damage to objects or reduce injury to persons which contact the jamb protection system.

Another significant object of particular embodiments of the invention can be to provide sufficient force dissemination on the surface of the jamb protection system. Force dissemination may reduce damage or injury to persons or objects which make contact with the jamb protection system and may also help eliminate the problem of cords, lines or hoses from catching or snagging on the jamb protection system.

Another object of particular embodiments of the invention can be to provide sufficient grip to secure the jamb protection system to the jamb. One aspect of this object may be to provide grip components which provide sufficient securement to prevent the jamb protection system from becoming dislodged due to the usual forces encountered during use. Another aspect of this object may be to provide grips that help alleviate marring, scratching, or other damage to the jamb.

Another object of particular embodiments of the invention can be to provide a jamb protection system which can have features conformed to hinge, baseboard, or other hardware or architectural configurations. One aspect of this object may be to allow for ease of installation. Another aspect of this object may be to provide for an installation which is properly aligned to the floor or to the jamb surfaces to help eliminate potential edges on which to snag or catch hose, lines, cords, or the like.

Still another object of particular embodiments of the invention can be to provide features which help eliminate catching or snagging of hoses, lines, cords, or the like as such items are pulled over or slide in contact with the jamb protection system. One aspect of this object may be the above-mentioned aligned fit due to having a design conformed to hinges, base boards, or the like. Another aspect of this object is to provide sufficiently hebetated surfaces which cords, hoses, lines, or the like may slide or move easily over.

Yet another object of particular embodiments of the invention can be to reduce damage or injury to objects or persons that make contact with the jamb protection system. One aspect of this object may be to provide force absorption elements which consume the force of impact with the jamb protection system. Another aspect of this object may be to provide force disseminating elements or elements sufficiently hebetated which can spread the impact of force over a greater surface area both with respect to the jamb protection system and the object or person contacting the system.

Another object of particular embodiments of the invention can be to make the jamb protection system easy to use. One aspect of this object may be to reduce the number of components which make up the system. Another aspect of this object may be to reduce the number of steps required to install the jamb protection system on a jamb. A third aspect of this object may be to make a jamb protection system where one size of jamb protection device fits numerous sizes of jambs without modification.

Another object of particular embodiments of the invention can be to make the jamb protection system less cumbersome. One aspect of this object may be to reduce the size of the jamb protection device. Another aspect of this object may be to reduce the weight of the jamb protection device by eliminating components such as snaps, clasps, straps, clips, or the like.

Yet another object of particular embodiments of the invention can be to provide informative indicia to the viewable surface of the jamb protection system. One aspect of this object may be a warning system to make the jamb protection system more noticeable. A second aspect of this object may be to provide information to persons around the jamb protection system, such as, off limits areas, safety glasses required, fire extinguishers, fire egress route instructions, or the like. A third aspect of this object may be to add color as a coding system for ready identification of different types of jamb protection devices.

Still another object of particular embodiments of the invention may be to provide gripping features that help eliminate damage to the jamb such as mars or scratches, or the like.

From the consumers point of view an object of particular embodiments of the invention can be to make the jamb protection system less expensive. This object may be accomplished by providing a jamb protection device having few components and which may be readily manufactured with a limited number of steps, or with personnel having less expertise.

Naturally, further independent objects of the invention are disclosed throughout other areas of the specification.

DETAILED DESCRIPTION OF THE PREFERRED EMBODIMENTS

The invention provides a jamb protection system and the methods which disclose how to make and how to use jamb protection technology. This jamb protection technology satisfies a long felt desire on the part of consumers for a jamb protection system that affords enhanced force absorbtion and dissemination features that may be less complex, easier to use, or less expensive than existing jamb protection devices.

Figure 1:
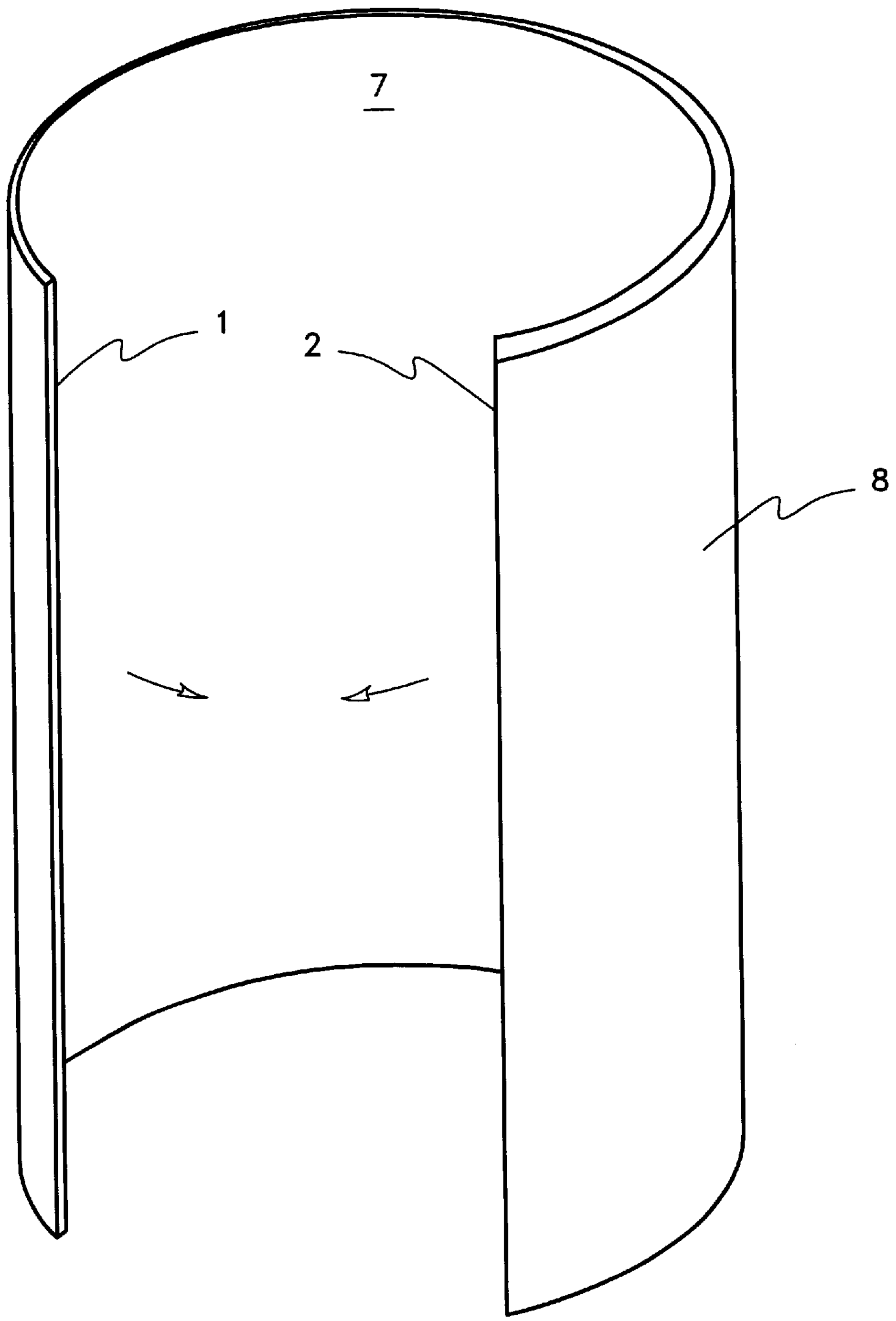
FIG. 1 shows a perspective view of a basic embodiment of the jamb protection system.
Figure 4:
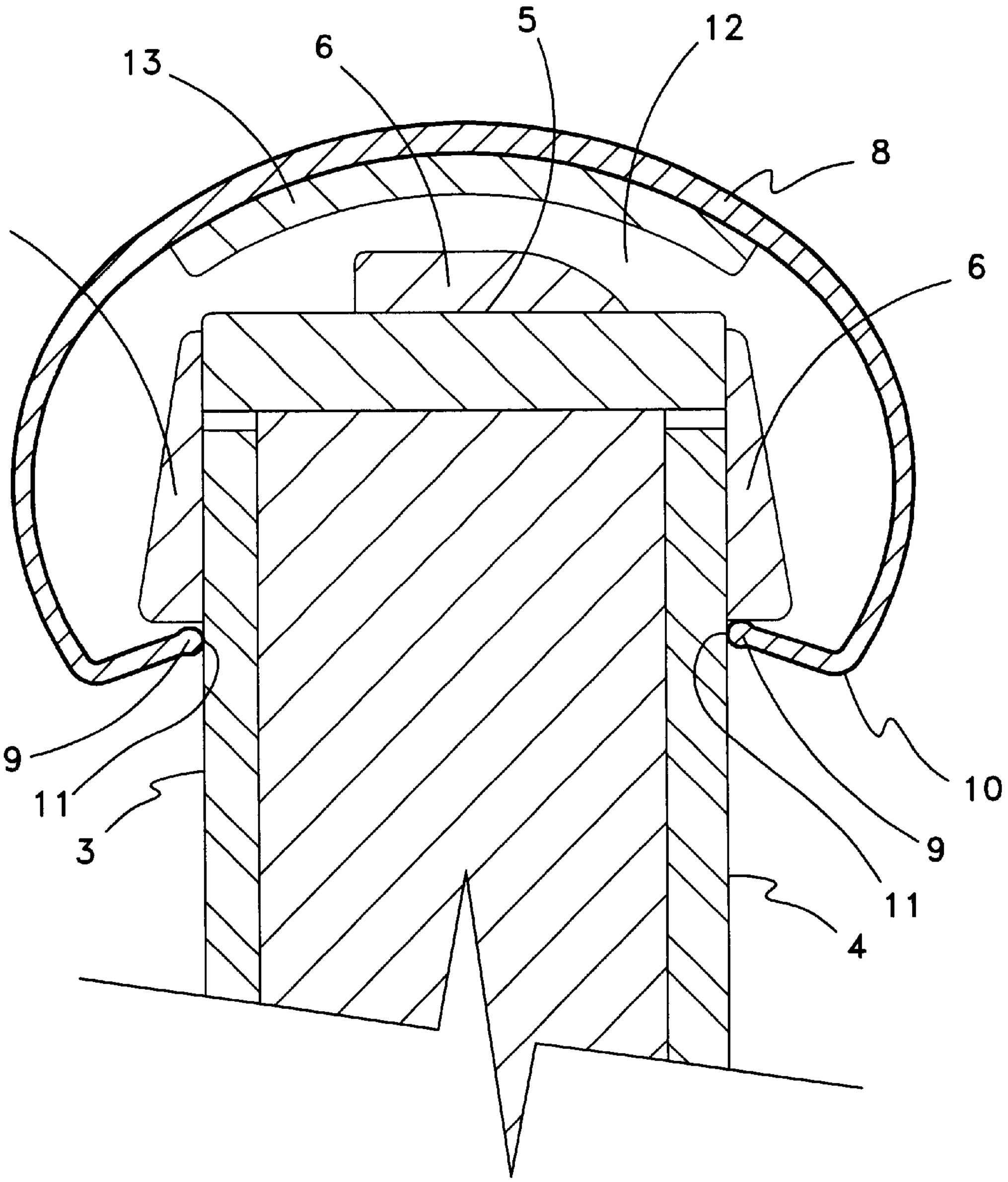
FIG. 4 shows a cross section view of a particular embodiment of the jamb protection system installed to a cased jamb.

Referring first to FIG. 1, a basic embodiment of the jamb protection invention is shown. This basic embodiment of the jamb protection invention can comprise a first compression surface (1), and a second compression surface (2). Understandably, the first compression surface (1) and the second compression surface (2) can be configured in a variety of ways so long as they can be positioned to direct compressive force toward a first wall surface (3) and a second wall surface (4) respectively as illustrated by FIG. 4. As such, the first compression surface (1) and the second compression surface (2) could merely comprise the terminal edges of a configured sheet of material as shown in FIG. 1.

Figure 2:
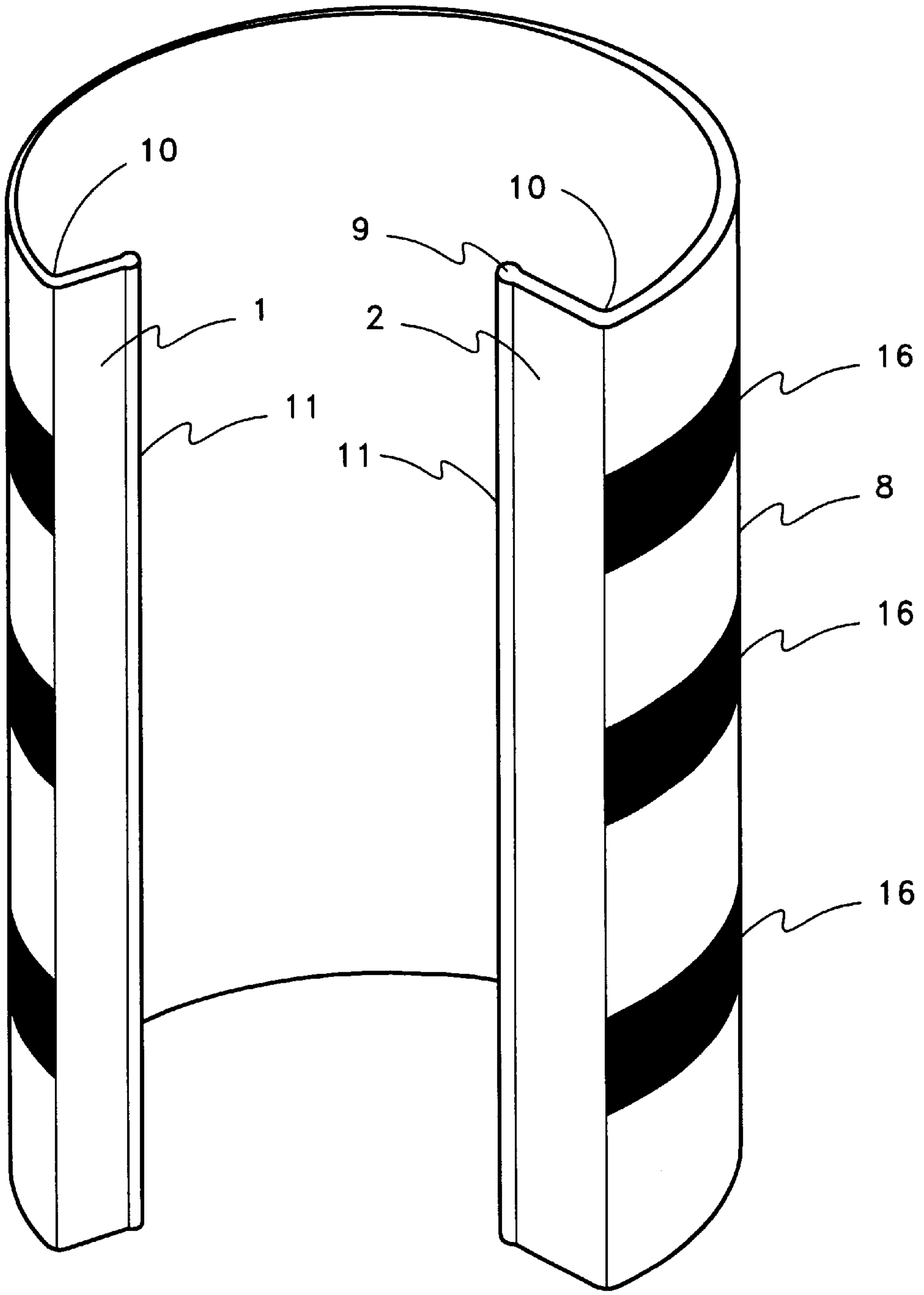
FIG. 2 shows a perspective view of a particular embodiment of the jamb protection system invention.
Figure 3:
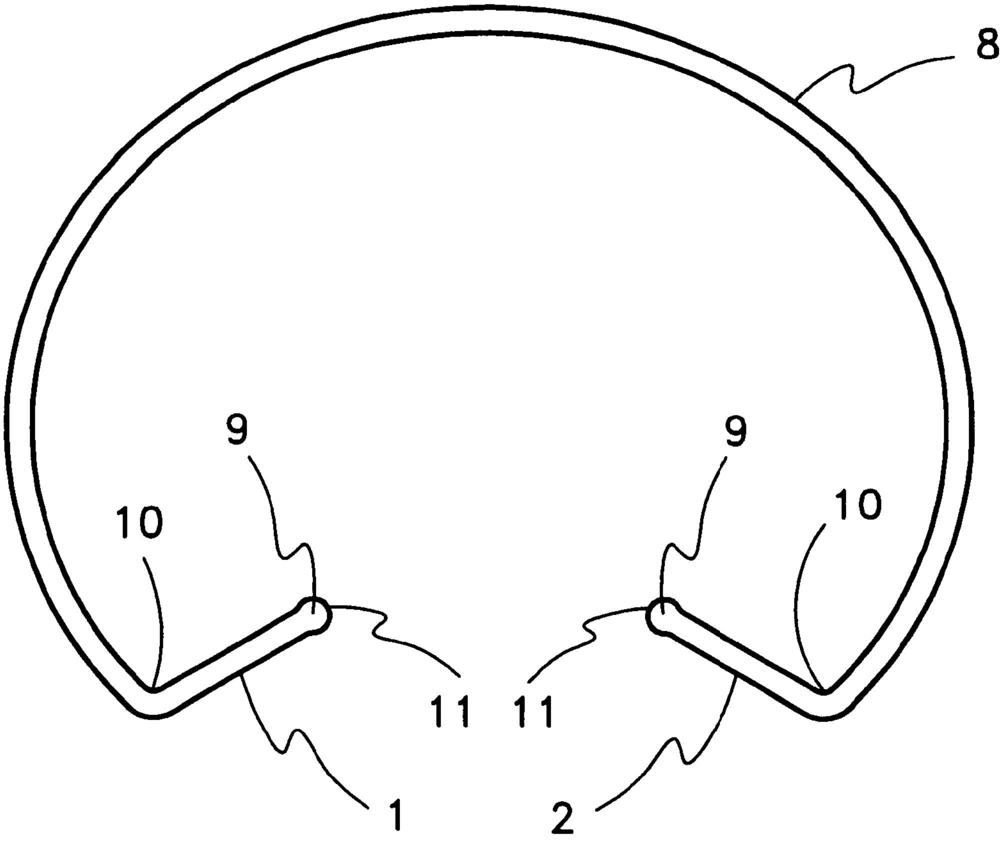
FIG. 3 shows a cross section view of a particular embodiment of the jamb protection system invention.

As shown primarily by FIGS. 2 and 3, the first compression surface (1) or the second compression surface (2) may have additional features coupled to them to enhance their gripping capacity to the first wall surface (3) and the second wall surface (4), to the jamb (5), or other moldings (6) attached to the first wall surface (3), the second wall surface (4), or the jamb (5). Naturally, because such other moldings may take a variety of forms these gripping enhancement features may take a variety of forms which will be further discussed below.

As can be understood from FIGS. 1, 2, and 3, the first compression surface (1) and the second compression surface (2) are a distance apart. Various embodiments of the invention may have different distances between the first compression surface (1) and the second compression surface (2) depending upon the distance between the first wall surface (3) and the second wall surface (4) in various applications. Similarly the height of the compression surfaces will vary with the actual height of the desired portion of the jamb to be protected.

Again referring to FIG. 1, the basic embodiment of the invention can comprise a compression generator (7). While the compression generator (7) in the embodiment of the inventions shown in FIGS. 1, 2, and 3 has been incorporated into these embodiments through the type of material selected which is resiliently flexible, and by the configuration chosen, the compression generator (7) could also comprise band springs, springs, stretch cord, or other device which would resist the movement of the first compression surface (1) away from the second compression surface (2).

The embodiments of the invention shown by FIGS. 1, 2, and 3, use a resiliently flexible material which upon extension returns substantially to the non-extended shape. This may be a plastic such as styrene, polyvinylchoride, ABS, or Kydex, as examples. Alternately, the material could be a metal such as aluminum or spring steel, or could be a laminate of the same or different plastics, plastic-paper, plastic-metal, or the like, as examples.

The embodiments of the invention shown by FIGS. 1–10 can further comprise a force dissemination surface (8) responsive to the first compression surface (1) and the second compression surface (2). As can be understood, the force dissemination surface (8) can cover a desired portion of: the first wall surface (3), the second wall surface (4), the jamb (5) or associated moldings (6). The force dissemination surface (8) could take a variety of configurations so long the desired portion of the jamb is covered or protected from impact from objects or persons.

The force dissemination surface (8) can be configured as a cylindroid or arcuate surface as shown by FIGS. 1, 2, and 3 having sufficient radius to minimize injury, prevent impalement, or prevent laceration to persons who may inadvertently fall in contact with the surface of the hebetated force dissemination surface (8). A radius of about half the width of the jamb may be typical. An embodiment of the invention used for standard architectural jambs may, for example, have a radius of between about 1 inch to about 3 inches. Naturally, the radius could be larger or smaller depending on the particular application.

Referring now to FIG. 2, the jamb protection system may further comprise a gripper element (9). The gripper element applies the compression force developed by the first compression surface (1) and the second compression surface (2) to the wall surfaces (3) (4), the jamb (5) features, or the molding (6) features to enhance the association of the invention with the jamb.

The gripper element (9) may also comprise an affirmatively selected gripper angle (10) which is selected to ascertain that the gripper element applies compression force to the jamb even when the first compression surface (1) and the second compression surface (2) may be at full extension. The gripper element may terminate in a gripper augmentation element (11). The gripper augmentation element (11) may enhance the securement of the gripper element (9) to the jamb. The gripper augmentation element (11) may comprise a radially enlarged terminal of the gripper element as shown by FIG. 2, or it may comprise a textured or otherwise configured surface at the terminal of the gripper. The gripper augmentation element (11) may be made from plastic, rubber, elastic, or the like.

Particular embodiments of the jamb protection invention may be made as one piece or comprise a unitized construct having elements selected from the group consisting of the first compression surface (1), the second compression surface (2), the compression generator (7), the force dissemination surface (8) the gripper element (9). Each of the above-mentioned elements may be unitized in various combinations or permutations, or alternately may be assembled from separate components.

As shown in FIG. 4, particular embodiments of the invention may also comprise a crumple zone (12) defined by the configuration of the force dissemination surface (8) and the jamb (5) or other molding features (6) that allows the force dissemination surface (8) to give inwardly toward the jamb (5) helping to extinguish the forces of impact with the force dissemination surface (8). The crumple zone (12) could be, for example, the entire area defined by the radius of the cylindroid shaped force dissemination surface (8) and the jamb (5).

Figure 5:
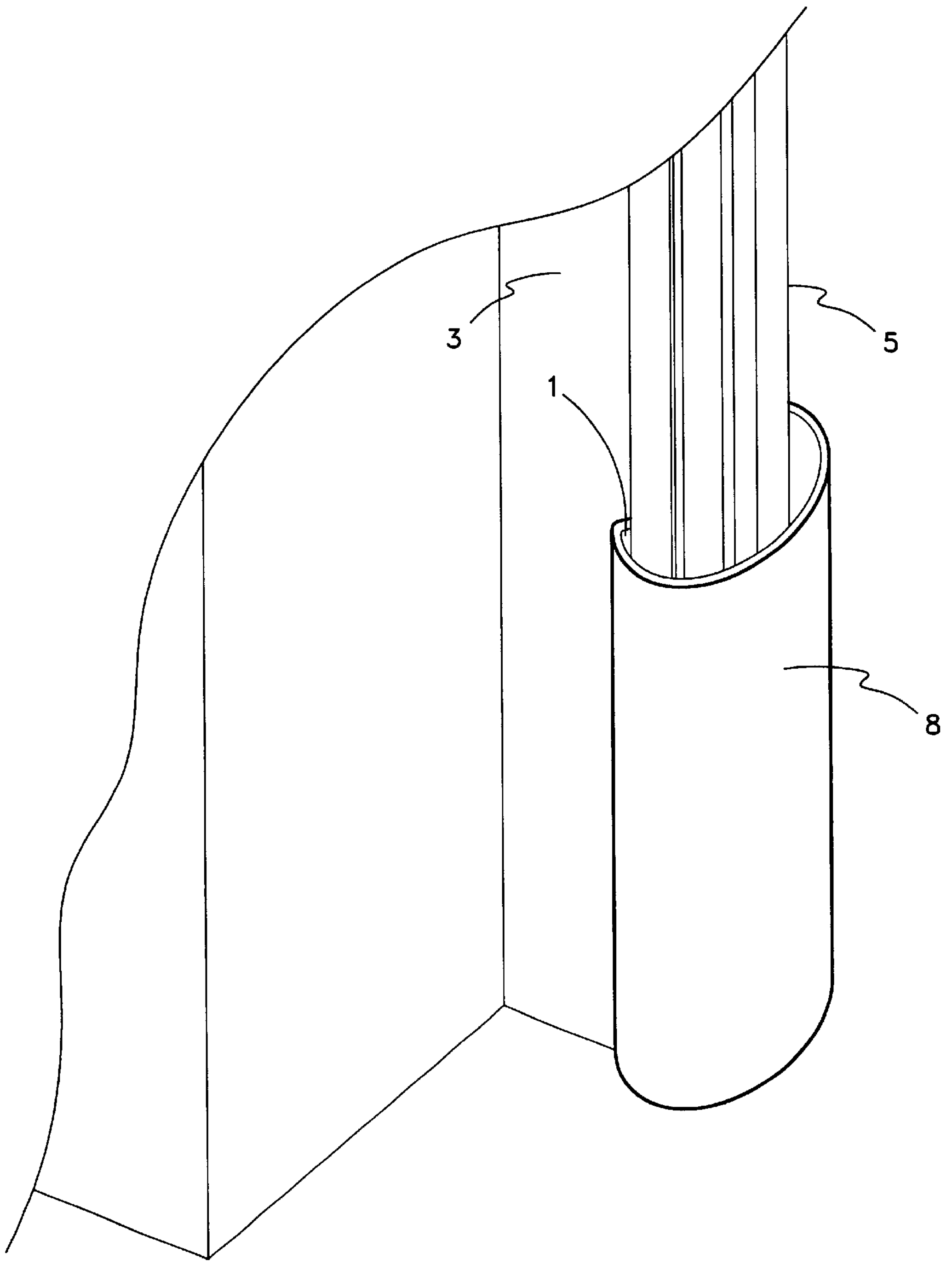
FIG. 5 shows a particular embodiment of the jamb protection system invention installed to a cased jamb.
Figure 10:
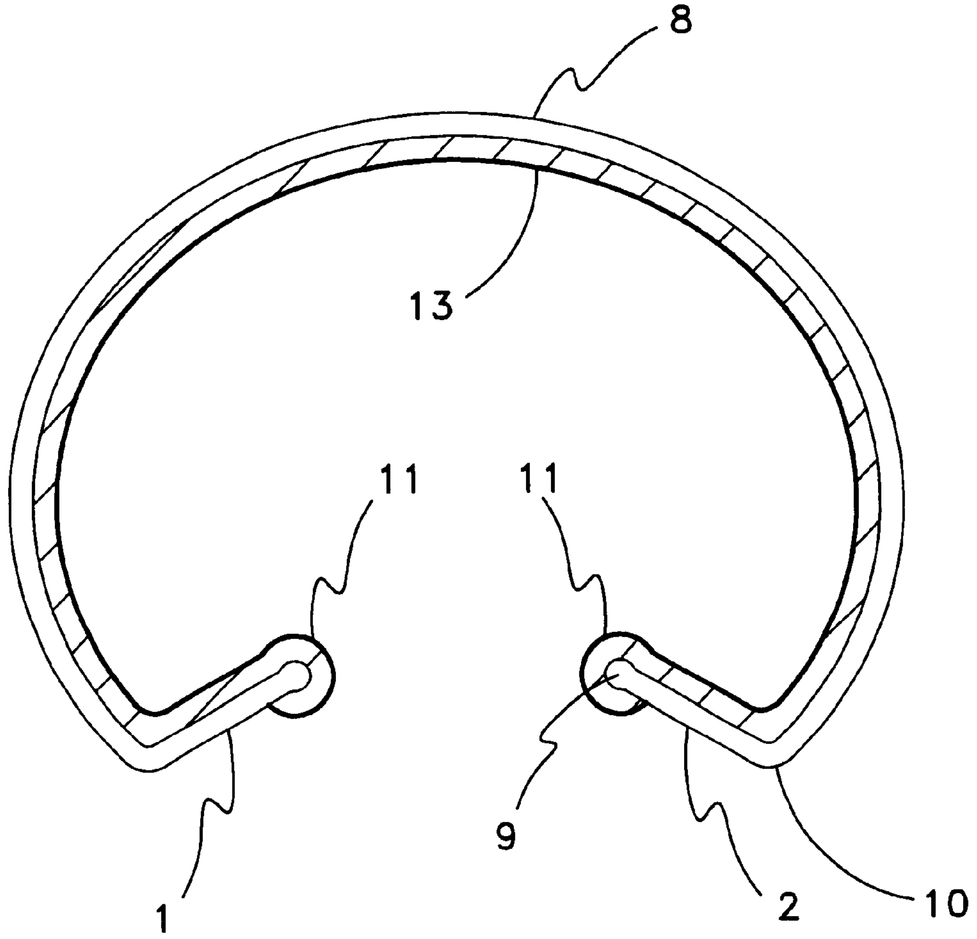
FIG. 10 shows a cross section view of a particular embodiment of the jamb protection system invention having a liner element.

Referring to FIGS. 5 and 10, particular embodiments of the invention may also comprise a force absorption element (13). The force absorption element could be made of foam rubber, plastic having entrapped air, a corrugated material, or a Styrofoam® like product, as examples. The force absorption element could naturally be sized or shaped as desired.

Figure 8:
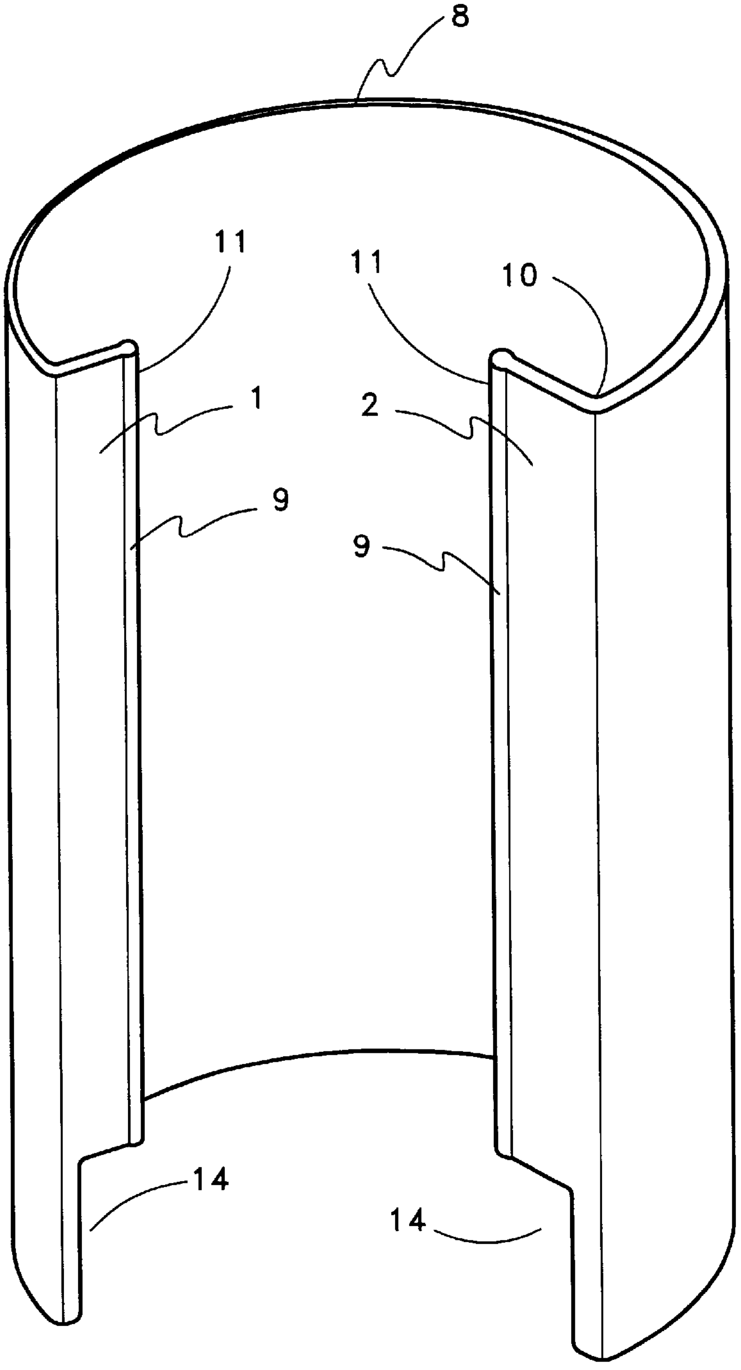
FIG. 8 shows a perspective view of a particular embodiment of the jamb protection system invention having an accommodation feature for a base board.

Referring to FIG. 8, the jamb protection system may further comprise a projection accommodation element(s) (14). The projection accommodation element(s) allows the jamb protection system to be installed in circumstances where the first wall surface (3), the second wall surface (4), or the jamb (5) may have features which project outwardly. The projection accommodation element(s) (14) allows the jamb protection system to be installed over features such as baseboards, or the like.

Figure 9:
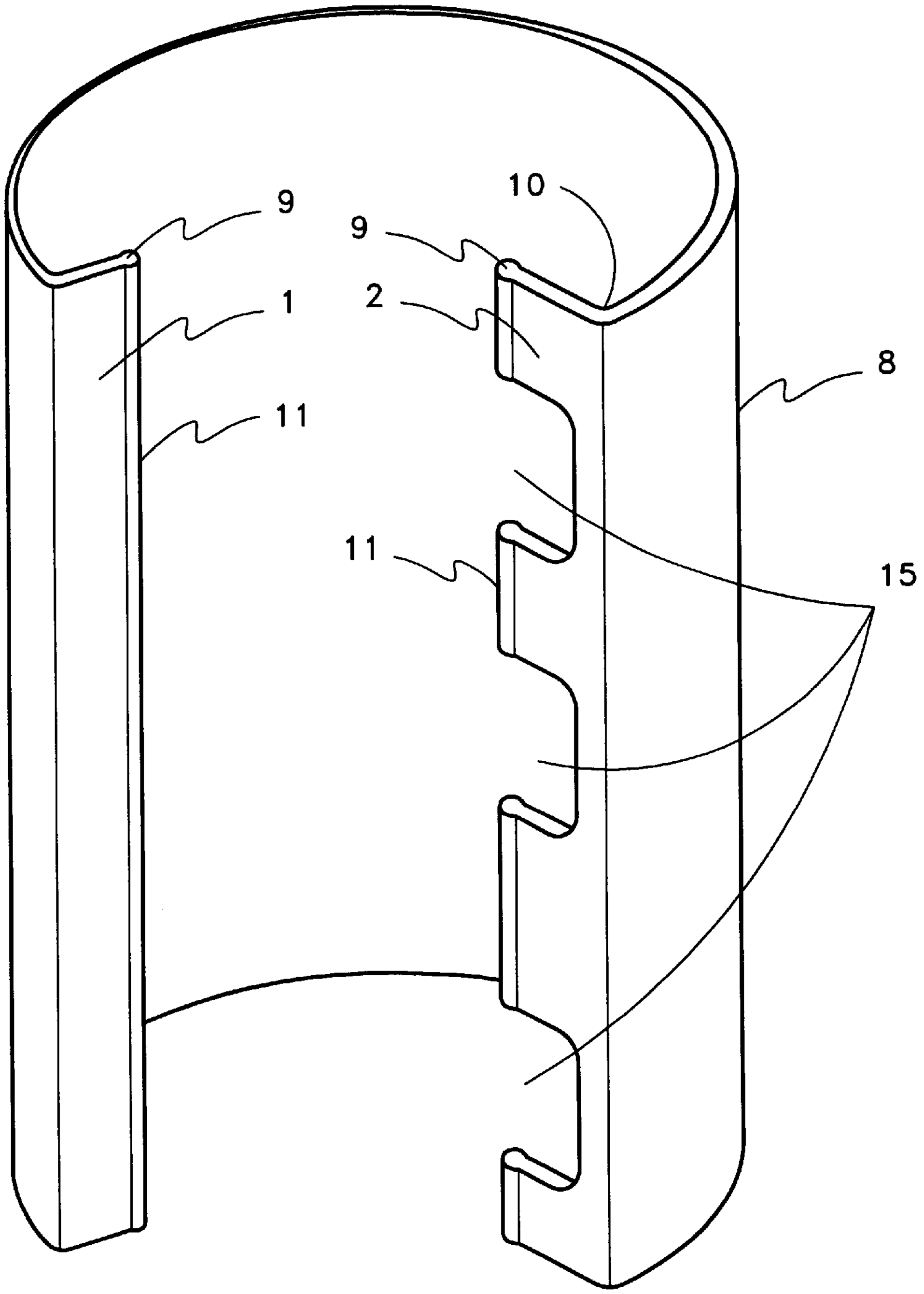
FIG. 9 shows a perspective view of a particular embodiment of the jamb protection system invention having an accommodation feature for a hinging system.

Similarly, referring to FIG. 9, the projection accommodation element(s) (14) may have various embodiments to work around other common hardware such as a hinge accommodation element (15) shown. Projection accommodation elements (14) may also be developed to allow installation of the jamb protection invention in conjunction with other architectural design or hardware features.

Figure 6:
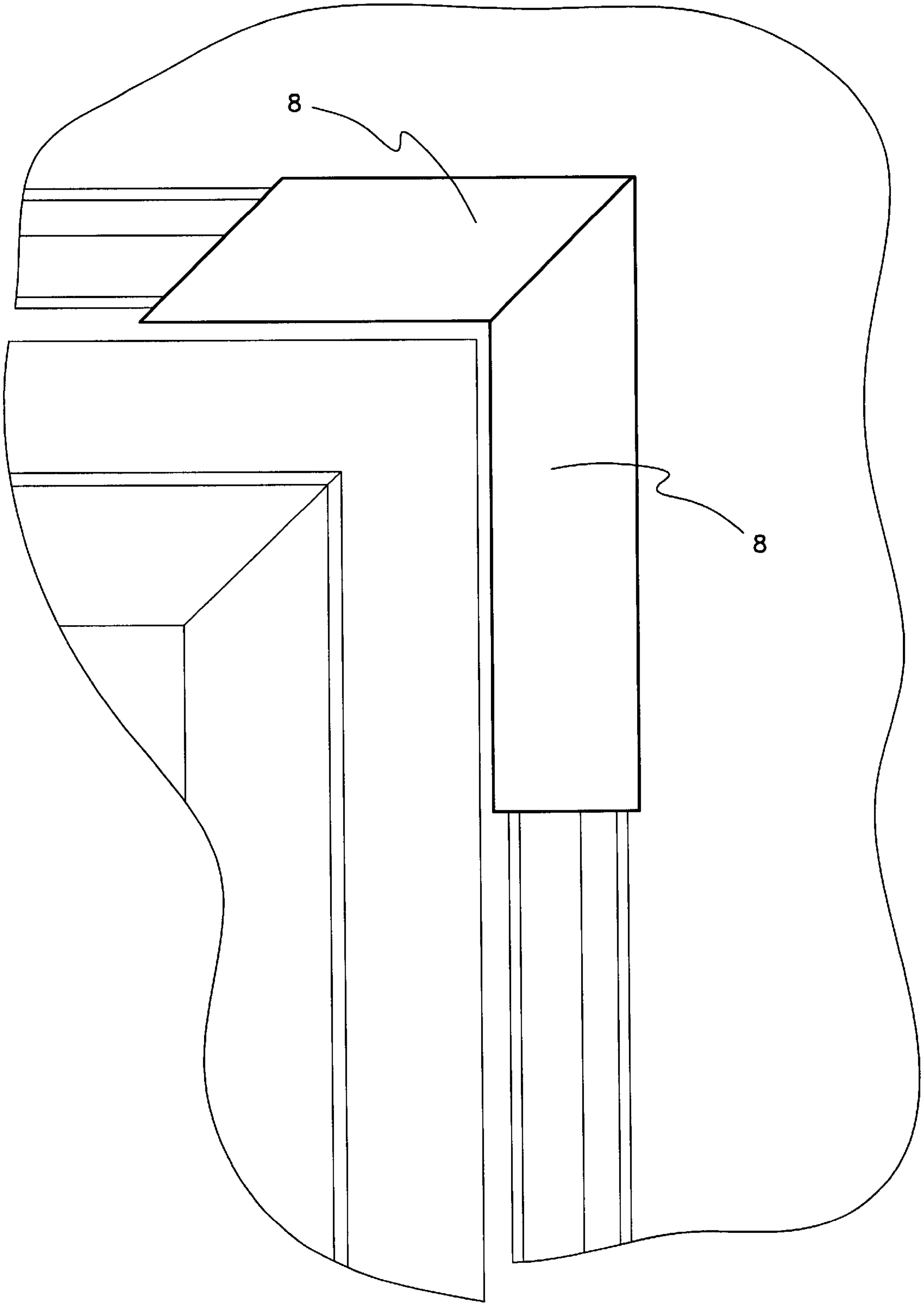
FIG. 6 shows a particular embodiment of the jamb protection system having mitered corners.
Figure 7:
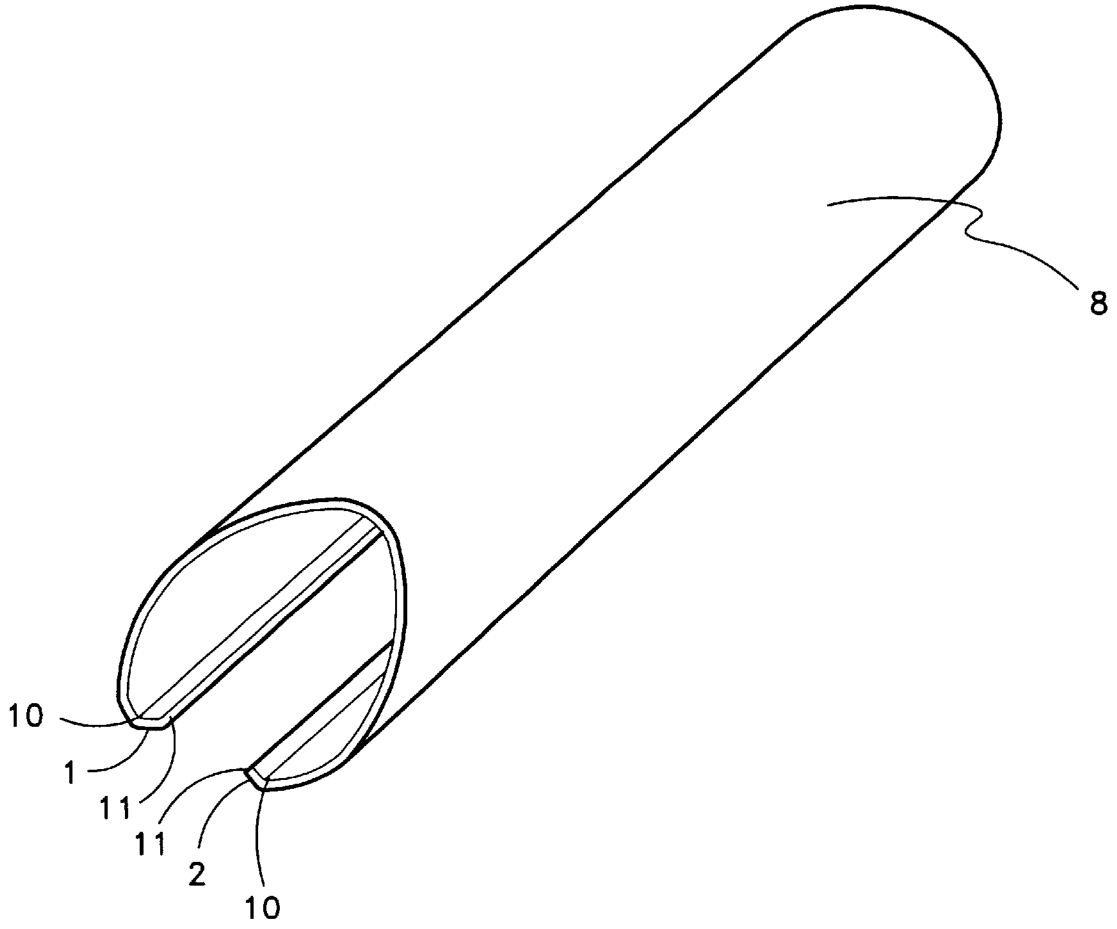
FIG. 7 shows a particular embodiment of the jamb protection system having mitered corners.

Referring now to FIGS. 5 and 6, the jamb protection system can be used to protect a jamb (5) whether cased or uncased. The first compression surface (1) and the second compression surface (2) can be separated a distance greater than the distance of the first wall surface (3) and the second wall surface (4). The first compression surface (1) is positioned against the first wall surface (3). The second compression surface (2) is positioned against the second wall surface (4). The desired portion of the jamb (5) can be covered by the force dissemination surface element (8). The compression generator (7) applies compressive force to the first compression surface (1) and to the second compression surface (2) allowing the compression surfaces or the gripper elements (9) to associate with the first wall surface (3) and the second wall surface (4) by application of compressive force. By positioning the force dissemination surface (8) in this manner the force dissemination surface (8) and the jamb (5) define the crumple zone (12). To remove the jamb protection system these steps are reversed.

Referring now to FIG. 6, the jamb protection system may be tailored to be complementary with the entire jamb. An embodiment of the invention may comprise matching mitered corners The miter could be adjusted depending on the geometric configuration of the jamb. Custom shaped jamb protection devices could be made to protect arches or other architectural configured jambs.

Again to FIG. 2, the jamb protection system may further incorporate informative indicia (16) such as colored elements, reflective elements, glow-in-the-dark elements or alpha-numerical elements as a means of warning, identification, or conveyance of information and the like.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in functionally-oriented terminology, each aspect of the function is accomplished by a device. Apparatus claims may not only be included for the devices described, but also method or process claims may be included to address the functions the invention and each element performs. Neither the description nor the terminology is intended to limit the scope of the claims.

Further, each of the various elements of the invention and claims may also be achieved in a variety of manners. This disclosure should be understood to encompass each such variation, be it a variation of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "compression generator" should be understood to encompass disclosure of the act of "generating compression"—whether explicitly discussed or not—and, conversely, were there only disclosure of the act of "generating compression", such a disclosure should be understood to encompass disclosure of a "compression generation" and even a means for "generating compression". Such changes and alternative terms are to be understood to be explicitly included in the description.

Additionally, the various combinations and permutations of all elements or applications can be created and presented. All can be done to optimize the design or performance in a specific application.

Any acts of law, statutes, regulations, or rules mentioned in this application for patent: or patents, publications, or other references mentioned in this application for patent are hereby incorporated by reference. Specifically, U.S. patent application Ser. No. 60/178,006 is hereby incorporated by reference herein including any figures or attachments, and each of the references in the Information Disclosure Statement are hereby incorporated by reference.

In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. However, as to each of the above, to the extent that such information or statements incorporated by reference might be considered inconsistent with the patenting of this/these invention(s) such statements are expressly not to be considered as made by the applicant(s).

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

Thus, the applicant(s) should be understood to claim at least: i) each of the embodiments of the jamb protection system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

We claim:

1. A jamb protection device, comprising:

a. a resiliently flexible arcuate body having a first edge and a second edge which terminate substantially parallel to each other at a distance apart, wherein said resiliently flexible arcuate body has a single continuous substantially non-compressible arcuate surface;

b. a first gripper element connected to substantially the entire length of said first edge; and c. a second gripper element connected to substantially the entire length of said second edge, whereby flexure of said resiliently flexible arcuate body allows substantially stationary engagement of said first gripper element and said second gripper element to a first wall surface and a second wall surface, and whereby said single continuous substantially non-compressible arcuate surface deforms to disseminate impact forces received to protect said jamb.

2. A jamb protection device as described in claim 1, wherein said first gripper element and said second gripper element each have a radial terminus.

3. A jamb protection device as described in claim 1 or 2, further comprising:

a. a first grip augmentation element connected to said first gripper element; and b. a second grip augmentation element connected to said second gripper element.

4. A jamb protection device as described in claim 3, wherein said first grip augmentation element and a second grip augmentation element comprise said radial terminus of said first gripper element and said second gripper element.

5. A jamb protection device as described in claim 3, wherein said first grip augmentation element connects to substantially the entire length of said first gripper element, and wherein said second grip augmentation element connects to substantially the entire length of said second gripper element.

6. A jamb protection device as described in claim 1, further comprising a jamb projection accommodation element.

7. A jamb protection device as described in claim 1, further comprising informative indicia selected from the group consisting of colored elements, reflective elements, florescent elements, glow-in-the dark elements, and alphanumeric elements.

* * * * *